United States Patent
Ando et al.

(10) Patent No.: US 11,163,410 B2
(45) Date of Patent: Nov. 2, 2021

(54) OPERATION DETECTION DEVICE

(71) Applicant: Murata Manufacturing Co., Ltd., Nagaokakyo (JP)

(72) Inventors: Masamichi Ando, Nagaokakyo (JP); Hiroaki Kitada, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 3 days.

(21) Appl. No.: 15/898,325

(22) Filed: Feb. 16, 2018

(65) Prior Publication Data

US 2018/0239452 A1    Aug. 23, 2018

Related U.S. Application Data

(63) Continuation of application No. PCT/JP2016/077030, filed on Sep. 14, 2016.

(30) Foreign Application Priority Data

Sep. 15, 2015    (JP) .............................. JP2015-181826

(51) Int. Cl.
  *G06F 3/044*  (2006.01)
  *G06F 3/01*   (2006.01)
  *G06F 3/041*  (2006.01)
(52) U.S. Cl.
  CPC .............. *G06F 3/0445* (2019.05); *G06F 3/01* (2013.01); *G06F 3/041* (2013.01); *G06F 2203/04105* (2013.01)
(58) Field of Classification Search
  CPC .................. G06F 3/0414; G06F 3/0412; G06F 2203/04103; G01L 1/16
  See application file for complete search history.

(56) References Cited

U.S. PATENT DOCUMENTS 6,231,520 B1 *  5/2001  Maezawa ............. A61B 5/0051
                                                600/552
6,234,045 B1 *  5/2001  Kaiser ................... F16F 7/1005
                                                74/572.2
8,493,359 B2 *  7/2013  Wright ................ G06F 3/03545
                                                178/18.06

(Continued)

FOREIGN PATENT DOCUMENTS

CN    102687200 A    9/2012
JP    H05-61592 A    3/1993

(Continued)

OTHER PUBLICATIONS

Han (Active muscle stiffness sensor based on piezoelectric resonance for muscle contraction estimation, Sensors and Actuators A: Physical, 194 (212-219)) (Year: 2013).*

(Continued)

*Primary Examiner* — Yuzhen Shen
(74) *Attorney, Agent, or Firm* — Arent Fox LLP

(57) ABSTRACT

An operation detection device includes an operation target that accepts contact operation, an operation detection unit that detects contact operation on the operation target as a voltage, a detection unit that detects a frequency of a change in the voltage; and a determination unit that determines a mode of operation of a living body performed on the operation target based on the frequency detected by the detection unit.

4 Claims, 7 Drawing Sheets

(56) References Cited

U.S. PATENT DOCUMENTS

| | | | |
|---|---|---|---|
| 9,698,776 B2* | 7/2017 | Toda | H03K 17/964 |
| 2008/0061969 A1* | 3/2008 | Okude | G08B 13/10 |
| | | | 340/541 |
| 2011/0161087 A1 | 6/2011 | Ashley et al. | |
| 2011/0167391 A1* | 7/2011 | Momeyer | G06F 1/1684 |
| | | | 715/863 |
| 2014/0198035 A1* | 7/2014 | Bailey | G06F 3/011 |
| | | | 345/156 |
| 2014/0354597 A1* | 12/2014 | Kitchens, II | G06F 1/3215 |
| | | | 345/175 |
| 2016/0356657 A1* | 12/2016 | Stansloski | G01L 1/18 |
| 2017/0110680 A1* | 4/2017 | Nasu | H01B 1/04 |

FOREIGN PATENT DOCUMENTS

| | | |
|---|---|---|
| JP | H05-152638 A | 6/1993 |
| JP | 2013-516703 A | 5/2013 |

OTHER PUBLICATIONS

Sadao Omata, New tactile sensor like the human hand and its applications, Sensors and Actuators A, 35, 9-15, 1992 (Year: 1992).*
International Search Report issued for PCT/JP2016/077030, dated Oct. 25, 2016.
Written Opinion of the International Searching Authority issued for PCT/JP2016/077030, dated Oct. 25, 2016.

* cited by examiner

OPERATION DETECTION DEVICE

CROSS REFERENCE TO RELATED APPLICATIONS

The present application is a continuation of International application No. PCT/JP2016/077030, filed Sep. 14, 2016, which claims priority to Japanese Patent Application No. 2015-181826, filed Sep. 15, 2015, the entire contents of each of which are incorporated herein by reference.

TECHNICAL FIELD

The present invention relates to an operation detection device for detecting operation performed by a living body on an operation target.

BACKGROUND ART

Japanese Patent Application Laid-Open No. 5-61592 discloses a touch input device provided with a pressure sensitive sensor on the upper surface of a touch panel.

A conventional piezoelectric sensor is attached to a panel of a display or the like, or is attached to a casing. For example in a case where an entire circumference of the piezoelectric sensor is fixed to the casing or the like, the deflection of the piezoelectric sensor becomes the largest when the center position of the piezoelectric sensor is pressed, and becomes small when a peripheral end portion is pressed. As a result, in the conventional piezoelectric sensor, even with application of the same pressing force, when the pressing position is different, the detected pressing force is different.

The present invention provides an operation detection device for detecting operation performed by a living body on an operation target with high accuracy.

BRIEF DESCRIPTION OF THE INVENTION

An operation detection device according to one aspect of the present invention includes an operation target (e.g., a touch screen or a casing) that accepts contact operation, an operation sensor that detects contact operation on the operation target as a voltage, a detection sensor that detects a frequency of a change in the voltage; and a determination unit that determines a mode of operation of a living body performed on the operation target based on the frequency detected by the detection unit.

The operation sensor can be, for example, a piezoelectric sensor, a strain sensor, or an optical sensor. The detection sensor then detects a frequency of a voltage change.

The detection unit records, for example, the voltage change as a signal on a time axis, and converts the signal on the time axis to a signal on a frequency axis, thereby extracting a frequency component. By analyzing the detected frequency component, the determination unit determines a mode of operation of the living body on the operation target such as the casing (e.g., the operation or non-operation to grasp the casing, the operation or non-operation to touch a touch panel, a pressing amount, etc.).

In the living body, a mechanical vibration of muscles (biological tremor) occurs as a physiological phenomenon. The biological tremor is a tremor with a constant frequency in a predetermined frequency band (e.g., a band of about 5 to 20 Hz). Therefore, when the detected voltage is vibrating at a frequency of about 5 to 20 Hz, the determination unit determines that the operation target has slightly been deformed at the frequency of about 5 to 20 Hz due to contact with the living body, and determines that the operation by the living body has been performed.

The biological tremor of a finger has a frequency of about 10 Hz when there is no load, and the frequency becomes higher as the load becomes higher. Accordingly, the operation detection device detects an operation amount (pressing force) by detecting the frequency change. Since the operation detection device detects the pressing force based on the frequency value instead of the voltage value (amplitude) itself, even when the pressing position changes, the detected pressing force remains unchanged so long as the pressing force is the same.

Further, the biological tremor is a phenomenon unique to the living body. When a frequency component is not detected within a predetermined frequency band even if an object other than the living body comes into contact and a voltage is detected, the determination unit determines that no operation has been performed. In the conventional piezoelectric sensor, even when pressing operation is performed by the object other than the living body, it is detected that the pressing operation has been performed. Therefore, in the conventional piezoelectric sensor, when a voltage is detected, it is not possible to distinguish whether or not the voltage has been generated by the user's intentional pressing operation. Further, in a capacitive touch panel, even in a case where touch operation is actually not performed (i.e., the operation surface has not been touched), when the capacitance changes, there is the possibility of erroneous detection that the touch operation has been performed. There is also the possibility of erroneous detection when a substance, metal, water or the like close to the dielectric constant of the finger comes into contact.

However, even when the pressing operation is performed by an object other than a living body, the operation detection device of the present invention does not detect that a pressing operation has been performed. When the user comes into contact with the touch panel through an object such as a pen, the biological tremor is transmitted to the touch panel via the pen, and it can thus be detected that the operation has been performed. That is, the operation detection device can detect with high accuracy only intentional operation, such as pressing, performed by the user.

In addition, since the biological tremor is detected by physical contact of the living body with the operation target, when the touch operation is not actually performed (i.e., the operation surface has not been touched) there is no erroneous detection that the touch operation has been performed.

It is preferable that the operation detection unit uses a piezoelectric body. As the piezoelectric body, for example, a piezoelectric sheet (piezoelectric film) such as PVDF can be used.

In particular, since polylactic acid has no pyroelectricity, it is preferred when installed in a position where the heat of the living body is easily transmitted, such as a touch panel.

When the operation detection device of the present invention is applied to a display device, it is preferable to use a chiral polymer having high transparency as the piezoelectric body. More preferably, it is uniaxially stretched polylactic acid (PLA), and further preferably L-type polylactic acid (PLLA).

According to the present invention, it is possible to highly accurately detect operation performed by the living body on the operation target (e.g., an operation surface).

DESCRIPTION OF THE PREFERRED EMBODIMENTS

Hereinafter, a display device including an exemplary operation detection device in accordance with the present invention will be described with reference to the drawings.

Figure 1:
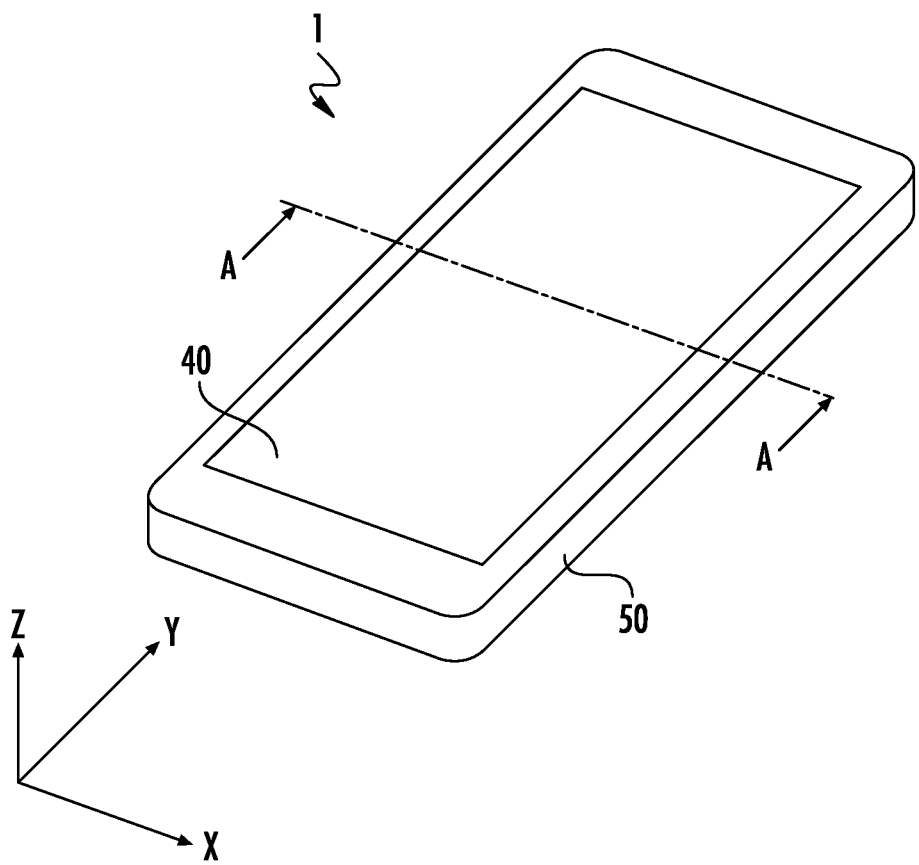
FIG. 1 is an external perspective view of a display device.

Display device 1 is preferably an information processing device such as a smartphone. As shown in an external perspective view of FIG. 1, the display device 1 includes a casing 50 having a rectangular parallelepiped shape in appearance and a planar front panel 40 disposed at a cavity on the upper surface of the casing 50.

The front panel 40 functions as a touch surface (an example of an operation target) on which the user performs a touch operation using his or her finger, a stylus or ppen held by the user's fingers.

In the present embodiment, a width direction (a lateral direction) of the casing 50 is taken as an X direction, a length direction (longitudinal direction) thereof is taken as a Y direction, and a thickness direction thereof is taken as a Z direction.

Figure 2:
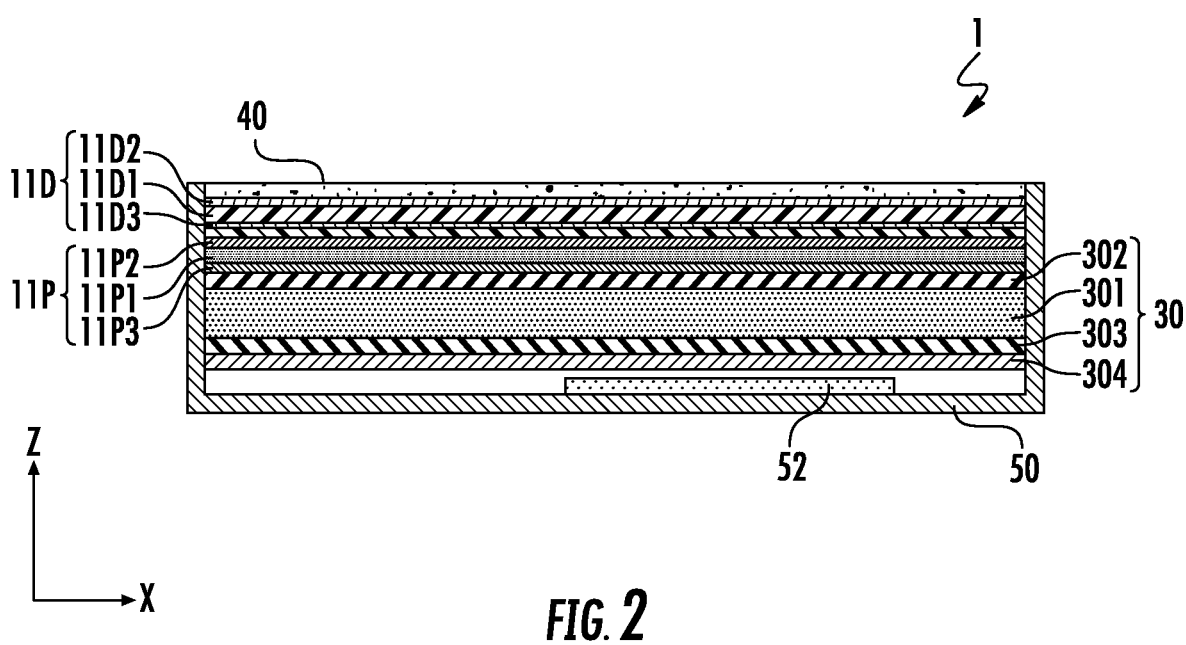
FIG. 2 is a side sectional view of the display device.

As shown in FIG. 2, a capacitance sensor 11D, a pressing sensor 11P, a display 30, and a control circuit module 52 are disposed inside the casing 50 along the Z direction in that order from the front panel 40 side of the casing 50. The touch panel is made up of the front panel 40, the capacitance sensor 11D, and the pressing sensor 11P.

The capacitance sensor 11D, the pressing sensor 11P, and the display 30 are preferably flat plates and are disposed inside the casing 50 so as to be parallel to the front panel 40 of the casing 50.

A circuit board (not shown) is preferably disposed between the bottom surface of the casing 50 and the display 30, and the control circuit module 52 is preferably mounted on the circuit board. The control circuit module 52 is preferably provided with modules constituting the control unit 20 shown in FIG. 5.

Figure 5:
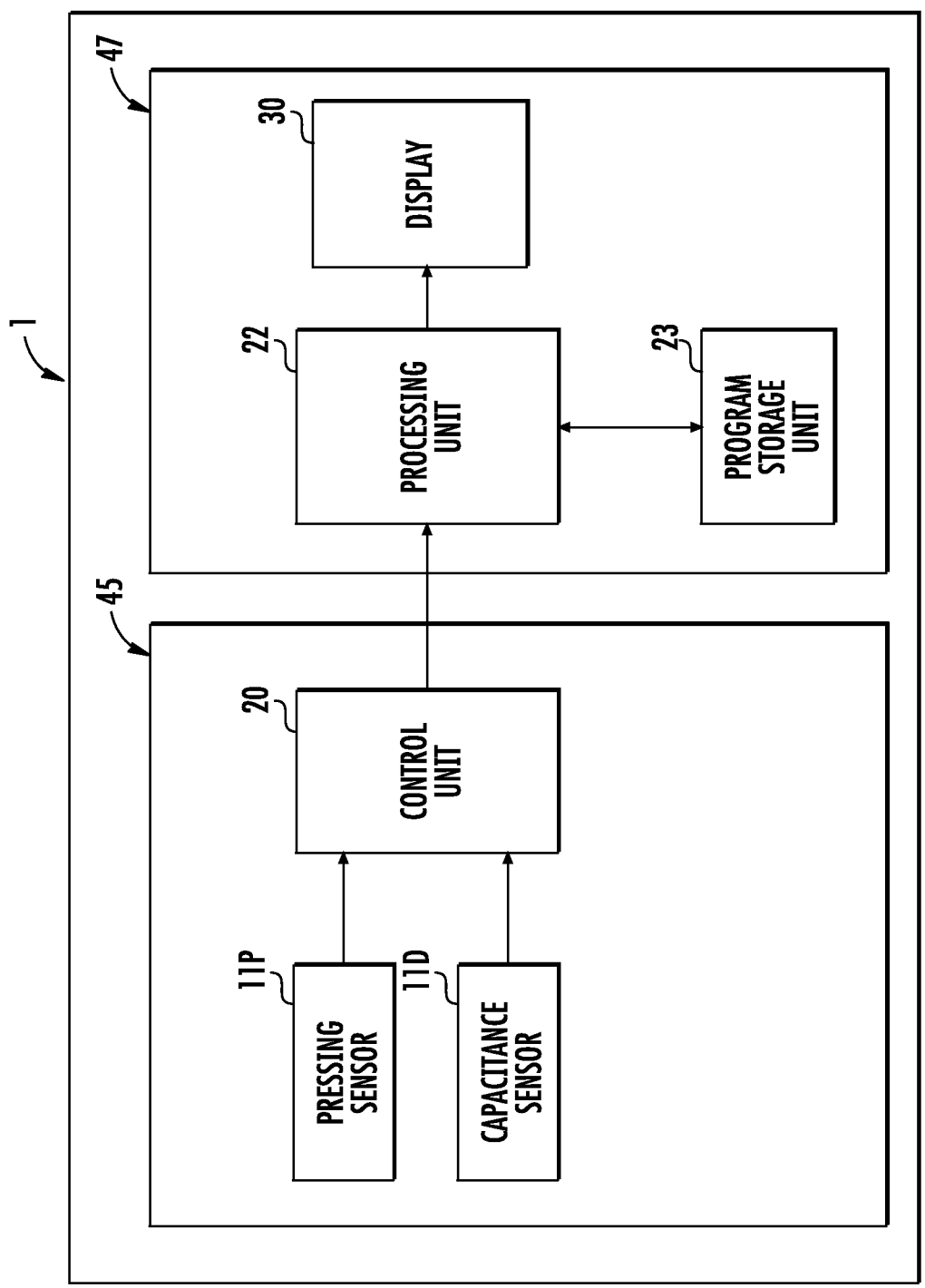
FIG. 5 is a block diagram of the display device.

As shown in FIG. 5, the display device 1 includes an operation detection circuit 45 and a processing circuit 47. The operation detection circuit 45 preferably includes the pressing sensor 11P, the capacitance sensor 11D and the control unit 20. However, the capacitance sensor 11D can be omitted. The processing circuit 47 preferably includes a processing unit 22, a program storage unit (memory) 23, and the display 30.

The control unit 20 is preferably a programmed CPU or other electronic circuit and operates as both a detection unit and a determination unit. The control unit 20 detects a touch position by detecting a change in capacitance at each electrode output from the capacitance sensor 11D. The control unit 20 outputs information (a position detection signal) indicating the detected touch position to the processing unit 22.

The processing unit 22 preferably includes a CPU and controls the processing circuit 47 in an integrated manner. That is, the processing unit 22 reads an operation program stored in the program storage unit 23 and performs various processes. For example, the processing unit 22 controls and causes the display 30 to display an image, decides an operation input content in accordance with the position detection signal input from the control unit 20, and changes the displayed image.

The display 30 is made up of, for example, a liquid crystal display element including a liquid crystal panel 301, a top surface polarizing plate 302, a rear surface polarizing plate 303, and a backlight 304.

The top surface polarizing plate 302 and the rear surface polarizing plate 303 are preferably disposed with the liquid crystal panel 301 interposed therebetween. The backlight 304 is preferably disposed on the opposite side of the liquid crystal panel 301 with the rear surface polarizing plate 303 interposed therebetween.

Light output from the backlight 304 is polarized by the rear surface polarizing plate 303 and reaches the top surface polarizing plate 302 via the liquid crystal panel 301. The liquid crystal panel 301 changes the polarization state for each pixel in accordance with control of the processing unit 22 and changes an amount of light passing through the top surface polarizing plate 302. The light output from the top surface polarizing plate 302 is output to the front panel 40 via the pressing sensor 11P and the capacitance sensor 11D. As a result, various images are displayed on the front panel 40.

The capacitance sensor 11D includes a flat plate-shaped insulating substrate 11D1, a plurality of capacitance detecting electrodes 11D2, and a plurality of capacitance detecting electrodes 11D3. The insulating substrate 11D1 is made of a material having transparency, such as a film made of PET, COP (cycloolefin polymer) or the like, a sheet or plate made of PC or PMMA (acrylic resin), or thin glass of about 0.1 mm to 0.7 mm.

Figure 3A:
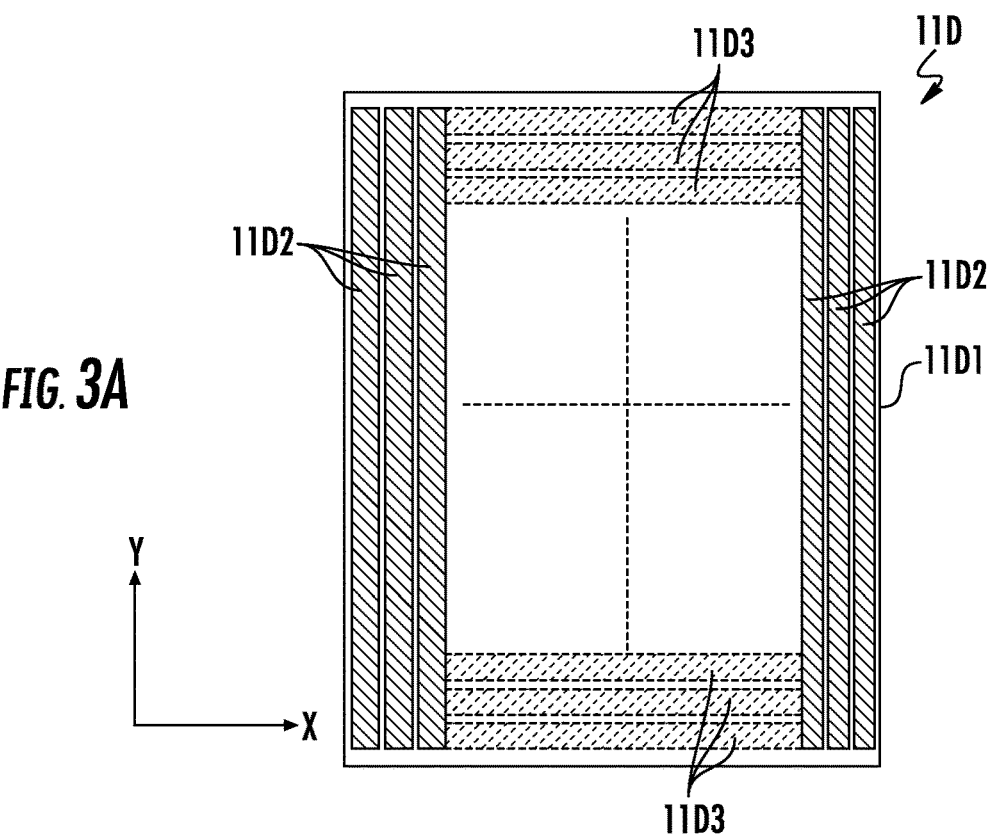
FIG. 3(A) is a plan view of a capacitance sensor.

One main surface of the insulating substrate 11D1 is formed with a plurality of capacitance detecting electrodes 11D2. As shown in FIG. 3(A), the plurality of capacitance detecting electrodes 11D2 preferably have rectangular shapes elongated in one direction in a plan view, and disposed such that the longitudinal direction is parallel to the Y direction. The plurality of capacitance detecting electrodes 11D2 are preferably disposed at predetermined intervals along the X direction.

The other main surface of the insulating substrate 11D1 is formed with a plurality of capacitance detecting electrodes 11D3. As shown in FIG. 3(A), the plurality of capacitance detecting electrodes 11D3 are also rectangular shapes long in one direction in a plan view. The plurality of capacitance detecting electrodes 11D3 are preferably disposed so that the longitudinal direction is parallel to the X direction. The plurality of capacitance detecting electrodes 11D3 are preferably disposed at predetermined intervals along the Y direction.

The plurality of capacitance detecting electrodes 11D2 and the plurality of capacitance detecting electrodes 11D3 are preferably all made of a material having transparency, and for example, a material containing indium tin oxide (ITO), zinc oxide (ZnO), or polythiophene as a main component is used.

The capacitance sensor 11D detects changes in capacitance generated when the user's finger approaches or comes into contact with the capacitance detecting electrode 11D2 and 11D3.

The mode of placement of the capacitance detecting electrode 11D2 and the capacitance detecting electrode 11D3 is not limited to this example.

Figure 3B:
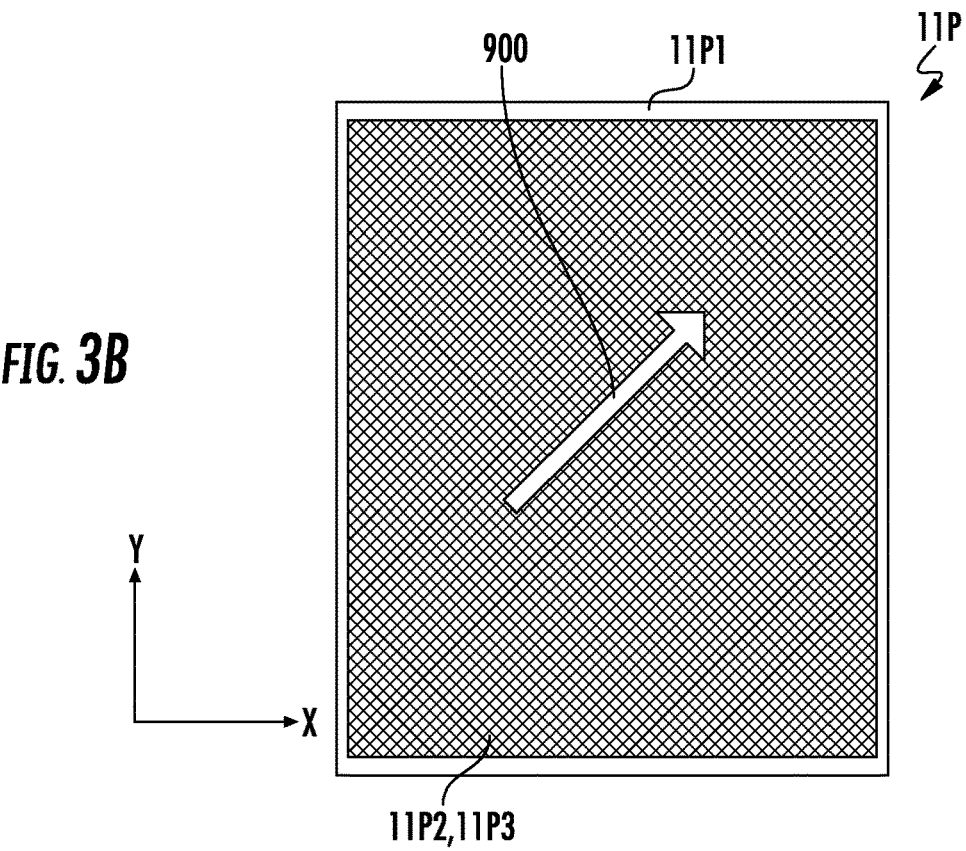
FIG. 3(B) is a plan view of a pressing detection sensor.

The pressing sensor 11P preferably includes a flat film-shaped piezoelectric film 11P1. One main surface of the piezoelectric film 11P1 is formed with a pressing detection electrode 11P2 and the other main surface thereof is formed with a pressing detection electrode 11P3. As shown in FIG. 3(B), the pressing detection electrode 11P2 and the pressing detection electrode 11P3 are preferably formed on substantially the entire surface of the main surface of the piezoelectric film 11P1.

The pressing detection electrode 11P2 and the pressing detection electrode 11P3 are preferably all made of a material having transparency, and for example, a material containing indium tin oxide (ITO), zinc oxide (ZnO), or polythiophene as a main component is used.

The piezoelectric film 11P1 deflects in a normal direction (the Z direction in FIG. 1) by the user pressing the front panel 40, and generates electric charge in response thereto.

For such a piezoelectric film 11P1, it is preferable to use a chiral polymer having high transparency. More preferably, it is uniaxially stretched polylactic acid (PLA), and further preferably L-type polylactic acid (PLLA). The chiral polymer has a main chain in a helical structure, and has piezoelectricity by uniaxial stretching of the chiral polymer and orientation of molecules. An amount of electric charge generated by the uniaxially stretched chiral polymer is uniquely decided by an amount of displacement of the front panel 40 in the normal direction.

A piezoelectric constant of uniaxially stretched PLLA belongs to a group of very high piezoelectric constants among polymers. That is, the pressing operation can be detected with high sensitivity, and the deformation detection signal in accordance with the pressing amount can be output with high accuracy.

The chiral polymer produces the piezoelectricity in a molecule orienting processing by stretching or the like, and does not need to be subjected to poling processing unlike other polymers such as PVDF or a piezoelectric ceramics. For this reason, the piezoelectric constant of PLLA does not fluctuate over time, and is very stable. Further, since polylactic acid has no pyroelectricity, even when the pressing sensor is disposed in a position close to the operation surface and the heat of the finger of the user or the like is transmitted, the amount of the detected electric charge remains unchanged. In the present embodiment, as shown in FIG. 3(B), the piezoelectric film 11P1 is disposed such that the uniaxial stretching direction 900 forms an angle of approximately 45° with respect to the X direction and the Y direction. By the placement described above, it is possible to detect the pressing operation with higher sensitivity.

Note that a stretch ratio is preferably about three to eight times. Performing heat treatment after stretching encourages crystallization of extended chain crystal of polylactic acid, to improve the piezoelectric constant. In the case of biaxial stretching, it is possible to obtain a similar effect to that of uniaxial stretching by making stretch ratios of the respective axes different. For example, when a sheet is stretched eight times in a given direction as the X axis direction and is stretched two times in the Y axis direction orthogonal to the X axis, it is possible to obtain substantially the same effect of the piezoelectric constant as in a case where a sheet is uniaxially stretched four times in the X axis direction. Since a simply uniaxially stretched sheet is likely to be broken in a stretching axis direction, it is possible to increase the strength to some extent by biaxially stretching as described above.

The pressing sensor (which cooperates with the control unit 20 to operate as an operation detection unit) is not limited to the piezoelectric sensor shown in the present embodiment, but the piezoelectric sensor preferably can detect even slight deformation of the front panel 40. The piezoelectric film 11P1 is not limited to the mode using PLLA, and a material with low transparency such as PVDF can be used. When the material with low transparency is used, the pressing sensor 11P is disposed on the lower surface side of the backlight 304. In this case, electrodes formed of silver paste or metal-based conductors formed by vapor deposition, sputtering, plating or the like can be used for the pressing detection electrode 11P2 and the pressing detection electrode 11P3. Alternatively, a compact pressing sensor may be disposed on the rear surface of a glass bezel portion (a portion having a relatively large area in the vicinity of a home button) on the operation surface.

Figure 4:
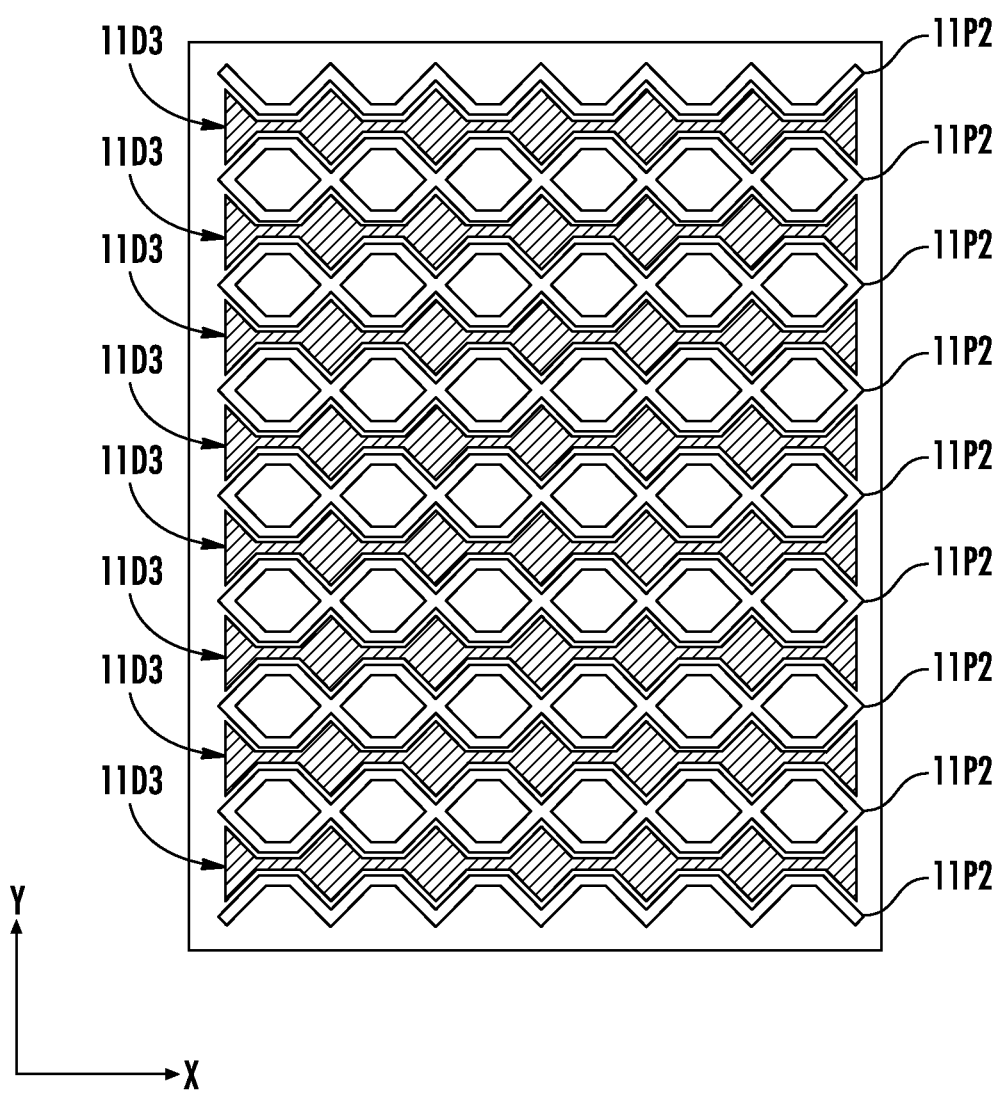
FIG. 4 is a plan view in a case where electrodes are formed in the same plane.

As shown in the plan view of FIG. 4, the pressing detection electrode 11P2 and the capacitance detecting electrode 11D3 can be formed in the same plane (e.g., on a single planar surface). In this case, the number of layers is reduced, thus allowing reduction in the thickness of the display device 1. In the example shown here, the pressing sensor is substantially equal to the size of the touch panel, and the pressing detection electrode 11P2 and the pressing detection electrode 11P3 are shown as linear electrodes, but a uniform electrode may be used unless being compounded with the capacitance detecting electrode 11D3, or the like. As described above, when the pressing sensor 11P is disposed on the lower surface side of the backlight 304, it is also possible to select a material having no transparency, such as aluminum vapor deposition or silver paste, for the electrode.

The control unit 20 detects a voltage (a potential difference detected by the pressing detection electrodes 11P2 and 11P3) generated in the piezoelectric film 11P1. The control unit 20 records the detected voltage value as a signal which varies on the time axis (i.e., over time). Further, the control unit 20 converts the signal on the time axis of the voltage value to a signal on a frequency axis. Based on the signal on the frequency axis, the control unit 20 determines whether a pressing operation has taken place and the pressing force of the pressing operation.

Figure 6:
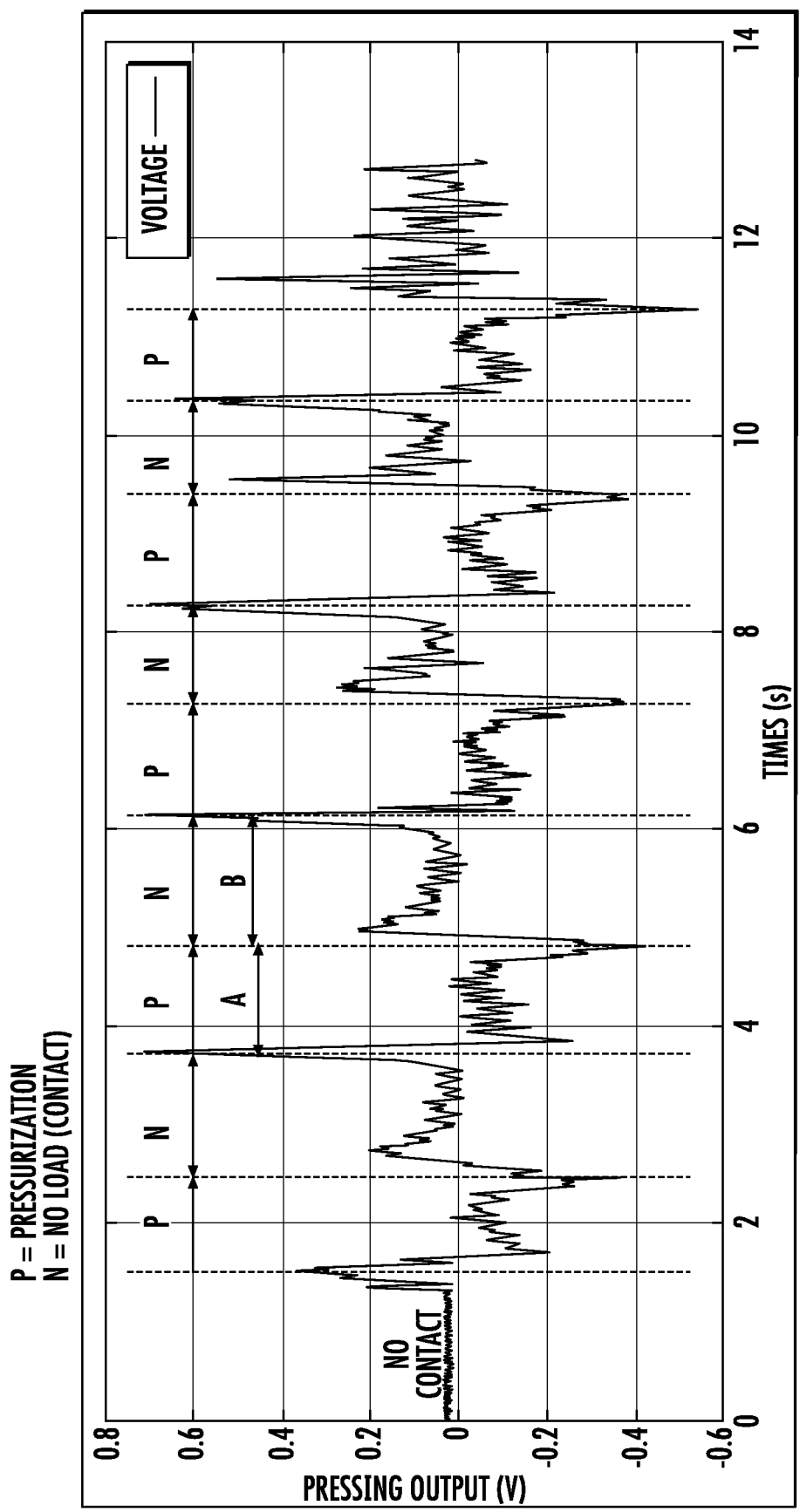
FIG. 6 is a diagram showing a signal on a time axis of a voltage value.

FIG. 6 is a diagram showing the voltage output of the pressing sensor 11P on the time axis. FIG. 6 shows an example of a case where the user repeatedly presses and releases the front panel 40 using his or her finger every 1.5 seconds. Before the user presses the front panel 40, his finger is not in contact with the front panel 40 and the voltage value is about 0 V. When he presses the front panel 40 a positive voltage peak appears.

The voltage is at its highest value at the start of pressing, namely when a deflection amount of the front panel 40 changes, and returns to 0 V when there is no change in the deflection amount of the front panel 40. However, since the pressing sensor 11P is provided with an adhesive for affixing various electrodes and the like, the piezoelectric film 11P1 deflects in the opposite direction by a stress relaxation action of these adhesives, and a negative voltage is detected. When the front panel 40 is continuously pressed with constant pressing force, there is no change in the deflection amount of the front panel and the voltage gradually returns to 0 V.

When the pressing force applied to the front panel 40 is released, a negative voltage peak appears. The voltage shows the highest value at the time of release of pressing, namely when the deflection amount of the front panel 40 changes, and returns to 0 V when there is no change in the deflection amount of the front panel 40. Again, since the pressing sensor 11P is provided with an adhesive for affixing various electrodes and the like, the piezoelectric film 11P1 deflects in the opposite direction by the stress relaxation action of these adhesives, and a positive voltage is detected.

Here, as shown in the signal on the time axis of FIG. 6, when the user's finger is in contact with the front panel 40 (a section during pressurization and no load), voltage fluctuation (vibration) of a constant frequency is detected.

Figure 7A:
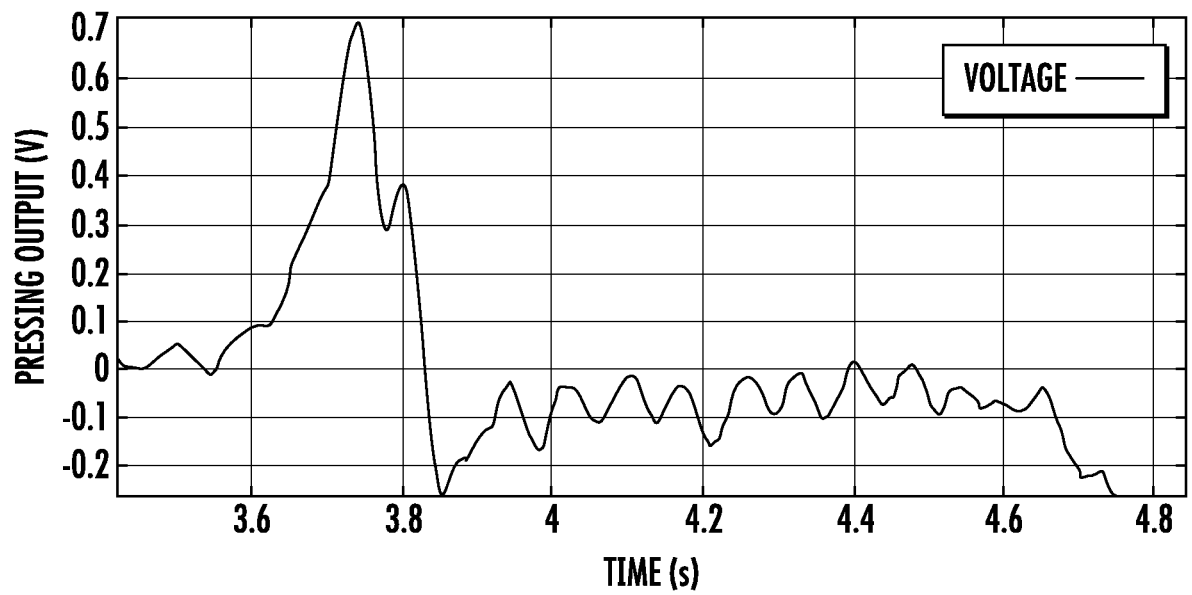
FIG. 7(A) is an enlarged diagram at the time of pressing.
Figure 7B:
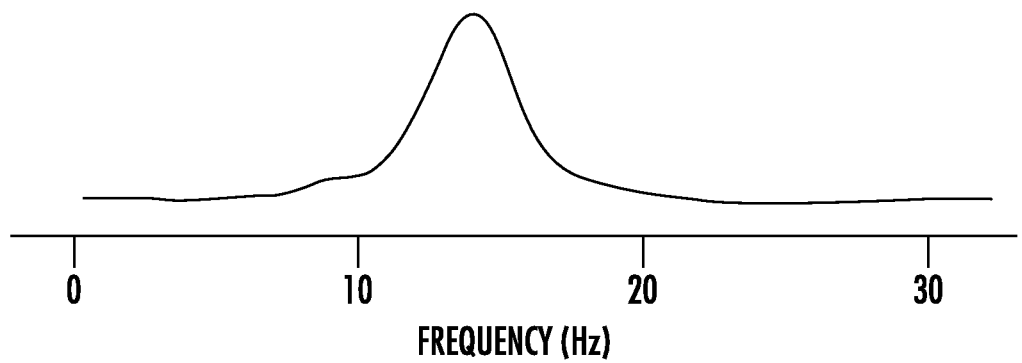
FIG. 7(B) is a diagram showing a signal on the frequency axis.

FIG. 7(A) is an enlarged diagram of the signal at the time of pressing (a time period of the pressing operation indicated by A in FIG. 6). FIG. 7(B) is a diagram showing a case where the signal on the time axis of the section is converted to a signal (power spectrum) on the frequency axis.

In a living body, a mechanical vibration of muscles (biological tremor) occurs as a physiological phenomenon. The biological tremor is a tremor with a constant frequency in a predetermined frequency band (e.g., a band of about 5 to 20 Hz). In the example shown in FIGS. 7(A) and 7(B), a vibration having a peak at about 14 Hz has been detected. Any method may be used for peak detection. For example, a frequency indicating the maximum value locally or a frequency at which a differential value becomes 0 may be detected. When a plurality of frequency peaks are detected, one may, for example, select a frequency indicating the highest level or a frequency with the highest Q value.

When a vibration showing a peak within a predetermined frequency band (e.g., 5 to 20 Hz) is detected, the control unit 20 determines that the touch operation has been performed. When a peak is not detected within the predetermined frequency band, the control unit 20 determines that a touch operation has not been performed. When detecting a touch operation, the control unit 20 outputs information indicating that a touch operation has been performed to the processing unit 22.

In the conventional piezoelectric sensor, even when pressing operation is performed by an object other than the living body, it is detected that the pressing operation has been performed. Therefore, in the conventional piezoelectric sensor, when a voltage is detected, it is not possible to distinguish whether or not the voltage has been generated by the user's intentional pressing operation. Further, in a capacitive touch panel, even in a case where touch operation is not performed (e.g., there is no contact between the user's finger and the operation panel), when the capacitance changes, there is the possibility of erroneous detection that a touch operation has been performed. There is also the possibility of erroneous detection when a substance, metal, water or the like close to the dielectric constant of the finger comes into contact with the operation panel.

However, the control unit 20 determines that a touch operation has been performed only when the user's finger (or an object held by the user's fingers) physically comes into contact with the operation panel (the front panel), whereby it is possible to determine the intentional touch operation of the user. Accordingly, the processing unit 22 can determine that a touch operation has occurred only when the user intentionally performs a touch operation.

Further, when the frequency component is not detected within the predetermined frequency band, the control unit 20 determines that a touch operation has not been performed. Therefore, even when the pressing operation is performed by the object other than a living body (or something held by the human body), the control unit 20 does not detect that the touch operation has been performed. When the user comes into contact with the touch panel via an object such as a pen, the biological tremor of the user is transmitted to the front panel 40 via the pen. Therefore, the control unit 20 can detect that touch operation has been performed.

Figure 8A:
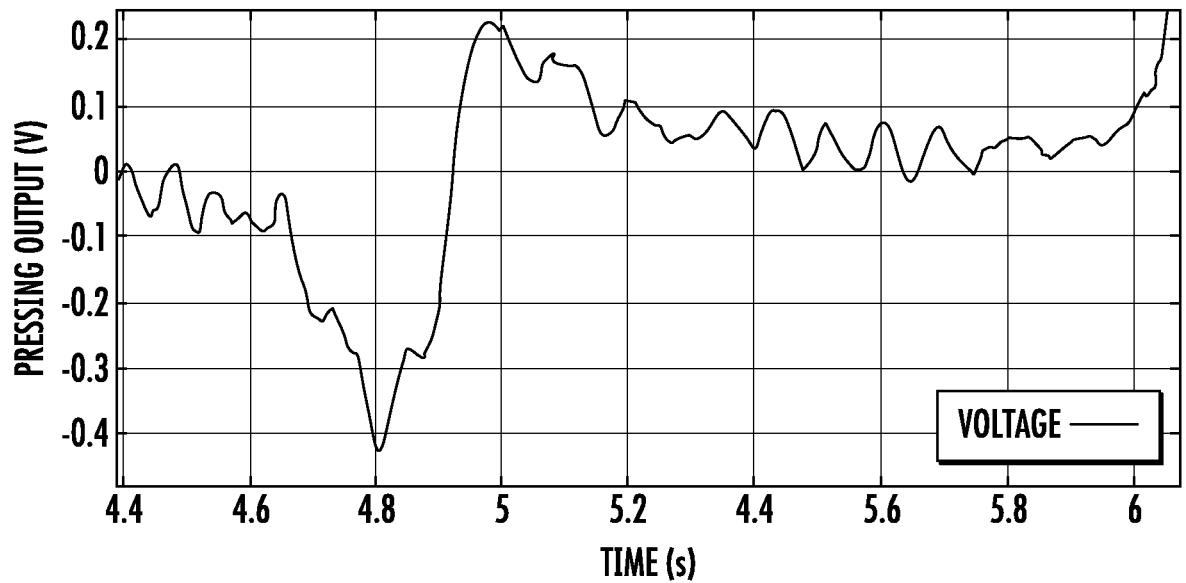
FIG. 8(A) is an enlarged diagram at the time of application of no load.
Figure 8B:
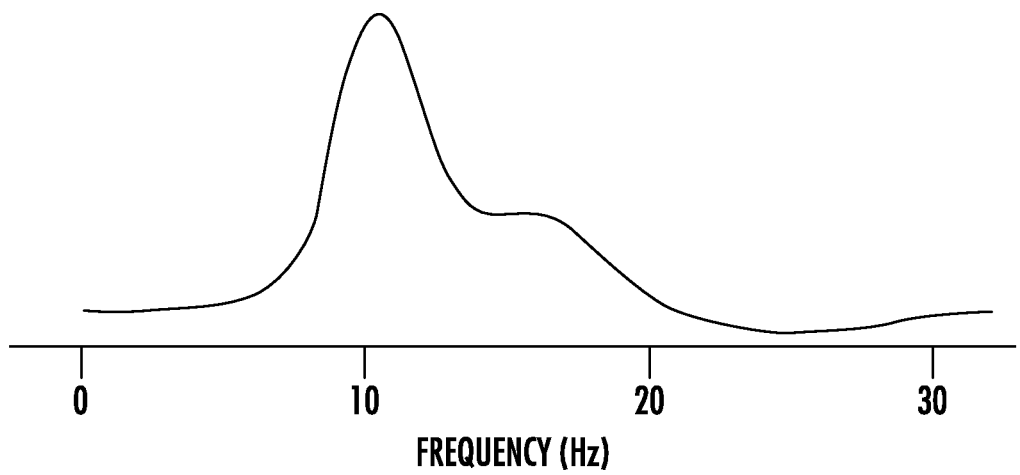
FIG. 8(B) is a diagram showing a signal on a frequency axis.

Next, FIG. 8(A) is an enlarged diagram of the signal at the time of pressing release (the time period indicated by B in FIG. 6). FIG. 8(B) is a diagram showing a case where a signal on the time axis of the section is converted to a signal (power spectrum) on the frequency axis.

At the time of pressing release, no pressing force (load) has been generated, but the finger touches the front panel 40. In this case, as shown in FIG. 8(B), a peak appears at a frequency (about 10 Hz) lower than the normal state in which the pressing force is generated.

Therefore, the control unit 20 can detect the pressing force by detecting the frequency change. In this example, 10 Hz is in a state where the pressing force is 0, and it is detected that the pressing force becomes stronger as the frequency increases. Since the control unit 20 detects the pressing force based on the frequency value instead of the voltage value (amplitude), even when the pressing position in the front panel 40 changes, the detected pressing force remains unchanged so long as the pressing force is the same.

The relationship between the pressing force and the frequency may be calibrated in an application program executed by the processing unit 22. For example, the processing unit 22 controls and causes the display 30 to display an image instructing to lightly touch the front panel 40 with the finger, and then records the detected frequency value as a frequency value at the time of no load (the state of no pressing force, only with contact by the finger). Thereafter, the processing unit 22 controls and causes the display 30 to display an image instructing the user to strongly press the front panel 40, and then records the detected frequency value as a frequency value at the time of the maximum load. Accordingly, the relationship between the pressing force and the frequency can be adjusted (customized) for each user.

The present embodiment has shown the example where the operation detection device detects both a touch operation (physical contact) and the pressing on the front panel in the display device. However, the operation detection device can also detect the pressing on the casing of the display device, for example. Further, the operation detection device can detect not only pressing, but can detect any operation so long as the operation target is deformed by operation of the living body.

For example, even when the user just grasps the casing, the operation detection device can detect that the user has grasped the casing since the biological tremor is transmitted to the piezoelectric film.

In addition, since there is a difference in detected frequency between a load when the casing is grasped and a load when the front panel is pressed, the operation detection device can individually detect these operations. For example, when a peak of about 10 Hz and a peak of about 14 Hz are simultaneously detected, the operation detection device can determine that the front panel is being pressed while the casing is grasped.

When no change in the capacitance is detected in the capacitance sensor and a frequency corresponding to the biological tremor is detected in the operation detection device, it is possible to determine that the operation of grasping the casing, not the touch operation, is being performed.

When the detected frequency changes while the capacitance sensor does not detect the change in capacitance, the operation detection device can determine that the user is in the state of pressing (strongly grasping) the casing.

Further, in the present embodiment, the example in which the operation detection device is applied to the display device has been shown, but it can be applied to any object so long as it is operated by the living body.

Further, in the present embodiment, the pressing sensor using the piezoelectric film has been shown as an example of the operation detection unit, but a sensor such as a strain sensor or an optical sensor can also be used to achieve the operation detection unit of the present invention.

DESCRIPTION OF REFERENCE SYMBOLS

11D: capacitance sensor
11D1: insulating substrate
11D2, 11D3: capacitance detecting electrode
11P: pressing sensor
11P1: piezoelectric film
11P2, 11P3: pressing detection electrode
20: control unit
22: processing unit
23: program storage unit
30: display
40: front panel
45: operation detection circuit
47: processing circuit
50: casing
52: control circuit module
301: liquid crystal panel
302: top surface polarizing plate
303: rear surface polarizing plate
304: backlight
900: uniaxially stretching direction

The invention claimed is:

1. A touch operation detection device, comprising:
   (a) an operation target;
   (b) a capacitance sensor which detects changes in capacitance when an object comes into contact with the operation target and generates a capacitance change signal in response thereto;
   (c) a piezoelectric sensor that senses a pressing force applied to the operation target and generates an output voltage as a function thereof; and
   (d) a controller that determines whether the object that has come into contact with the operation target is a human as a function of the capacitance change signal and the output voltage, the controller making the determination as a function of:
      (i) whether the capacitance change signal indicates that the capacitance of the capacitance has changed; and
      (ii) whether a peak frequency of the output voltage falls within a predetermined range corresponding to human biological tremors during a time period when the capacitance of the capacitive sensor has changed.

2. The touch operation detection device according to claim 1, wherein the capacitance sensor also detects changes in capacitance when the object approaches the operation target.

3. The touch operation detection device according to claim 1, wherein the piezoelectric sensor contains polylactic acid.

4. The operation detection device according to claim 1, wherein the operation target is a touch screen.

* * * * *